United States Patent
Patel et al.

(10) Patent No.: US 11,608,462 B2
(45) Date of Patent: Mar. 21, 2023

(54) DRILLING FLUIDS COMPRISING DEEP EUTECTIC SOLVENTS AND METHODS FOR DRILLING WELLS IN SUBTERRANEAN FORMATIONS

(71) Applicant: Saudi Arabian Oil Company, Dhahran (SA)

(72) Inventors: Hasmukh A. Patel, Katy, TX (US); Carl J. Thaemlitz, Houston, TX (US)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 16/991,531

(22) Filed: Aug. 12, 2020

(65) Prior Publication Data
US 2022/0049145 A1  Feb. 17, 2022

(51) Int. Cl.
   C09K 8/34  (2006.01)
   C09K 8/03  (2006.01)
   C09K 8/035 (2006.01)

(52) U.S. Cl.
   CPC ............. *C09K 8/34* (2013.01); *C09K 8/032* (2013.01); *C09K 8/035* (2013.01)

(58) Field of Classification Search
   CPC ... C09K 8/03; C09K 8/04; C09K 8/08; C09K 8/032; C09K 8/035; C09K 8/26; C09K 8/8265; C09K 8/28; C09K 8/32; C09K 8/34
   See application file for complete search history.

(56) References Cited

U.S. PATENT DOCUMENTS

| | | |
|---|---|---|
| 9,079,156 B2 | 7/2015 | Aduri et al. |
| 9,120,809 B2 | 9/2015 | Aduri et al. |
| 2012/0028855 A1* | 2/2012 | Miller ............ C09K 8/22 507/129 |
| 2019/0127623 A1* | 5/2019 | Smith ............ C09K 8/845 |
| 2019/0262647 A1* | 8/2019 | Havelka-Rivard .. A62D 1/0071 |

FOREIGN PATENT DOCUMENTS

| | | | |
|---|---|---|---|
| CN | 111394579 A | 7/2020 | |
| WO | 2009120839 A2 | 10/2009 | |
| WO | 2012145522 A2 | 10/2012 | |
| WO | WO-2014167375 A1 * | 10/2014 | ............ C09K 8/06 |
| WO | 2015128550 A1 | 9/2015 | |
| WO | 2016027280 A2 | 2/2016 | |

OTHER PUBLICATIONS

International Search Report and Written Opinion dated May 3, 2021 pertaining to International application No. PCT/US2021/014349 filed Jan. 21, 2021, 13 pages.
Mohsenzadeh et al., "The novel use of Deep Eutectic Solvents for enhancing heavy oil recovery", Journal of Petroleum Science and Engineering, vol. 130, pp. 6-15, 2015.
Mohsenzadeh et al., "Investigation of formation damage by Deep Eutectic Solvents as new EOR agents", Journal of Petroleum Science and Engineering, vol. 129, pp. 130-136, 2015.
Smith et al., "Deep Eutectic Solvents (DESs) and Their Application", Chemical Reviews, vol. 114, pp. 11060-11082, 2014.

* cited by examiner

*Primary Examiner* — Angela M DiTrani Leff
(74) *Attorney, Agent, or Firm* — Dinsmore & Shohl LLP

(57) ABSTRACT

A drilling fluid comprises one or more deep eutectic solvents in an amount greater than or equal to 70 wt. % based on the total weight of the drilling fluid. Each deep eutectic solvent comprises at least one hydrogen bond acceptor compound and at least one hydrogen bond donor compound. A molar ratio of the total moles of the hydrogen bond donor compounds to the total moles of the hydrogen bond acceptor compounds in each deep eutectic solvent is from 0.1 to 1.0. The drilling fluid has a density greater than or equal to 200 kg/m3. The drilling fluid has a viscosity greater than or equal to 0.5 Pa·s when measured at 25° C. Methods for drilling wells in subterranean formations using the drilling fluid are also disclosed.

11 Claims, No Drawings

DRILLING FLUIDS COMPRISING DEEP EUTECTIC SOLVENTS AND METHODS FOR DRILLING WELLS IN SUBTERRANEAN FORMATIONS

BACKGROUND

Field

The present disclosure relates to natural resource well drilling and, more specifically, to drilling fluids and methods for drilling wells in subterranean formations using such drilling fluids.

Technical Background

During rotary drilling of a well, a drill bit is inserted into a pre-drilled hole and rotated to break, crush, or cut the rock at the bottom of the hole to form the well. Drilling fluids, also referred to as drilling muds, are pumped down through a drill string to the drill bit and are recirculated back to the surface, which functions to lift and remove pieces of rock, also referred to as cuttings, produced during drilling from the bottom of the well. Common classifications of drilling fluids include water-based and oil-based drilling fluids. Water-based and oil-based drilling fluids generally comprise an aqueous or oleaginous base fluid and a plurality of additives, such as bridging materials, clay stabilizers, emulsifiers, fluid loss control materials, and weighting materials. These drilling fluids are complex mixtures that are typically formulated on-site based on the specific properties of the subterranean formation and require significant logistical support. Moreover, while the additives used to formulate the drilling fluids may be useful to tailor the properties as desired, the resulting increased solids content may result in pipes becoming stuck during drilling operations, a reduction in the strength of the subterranean formation, a reduction in the rate of penetration of the drill bit, or combinations of these.

SUMMARY

Accordingly, there is an ongoing need for improved drilling fluids and methods for drilling wells in subterranean formations. The drilling fluids of the present disclosure generally comprise one or more deep eutectic solvents. These deep eutectic solvents may comprise at least one hydrogen bond acceptor compound and at least one hydrogen bond donor compound, which are capable of self-association via hydrogen bond interactions to form a eutectic system having a melting point less than the melting points of the individual compounds. The use of deep eutectic solvents may allow for the tailoring of the properties of the drilling fluid using as little as two major components. This may allow for a simplified preparation process and the quick and efficient formulation of the drilling fluid on-site of the drilling operations. This may also allow for the formulation of drilling fluids without the use of solid additives and, as a result, reduce the negative effects resulting from increased solids content in the drilling fluid.

According to one or more embodiments of the present disclosure, a drilling fluid may comprise one or more deep eutectic solvents in an amount greater than or equal to 70 weight percent (wt. %) based on the total weight of the drilling fluid. Each deep eutectic solvent may comprise at least one hydrogen bond acceptor compound and at least one hydrogen bond donor compound. A molar ratio of the total moles of the hydrogen bond donor compounds to the total moles of the hydrogen bond acceptor compounds in each deep eutectic solvent may be from 0.1 to 1.0. The drilling fluid may have a density greater than or equal to 200 kilograms per cubic meter ($kg/m^3$). The drilling fluid may have a viscosity greater than or equal to 0.5 pascal-seconds (Pa·s) when measured at 25 degrees Celsius (° C.).

According to one or more additional embodiments of the present disclosure, a method for drilling a well in a subterranean formation may comprise operating a drill in the subterranean formation in the presence of a drilling fluid. The drilling fluid may comprise one or more deep eutectic solvents in an amount greater than or equal to 70 wt. % based on the total weight of the drilling fluid. Each deep eutectic solvent may comprise at least one hydrogen bond acceptor compound and at least one hydrogen bond donor compound. A molar ratio of the total moles of the hydrogen bond donor compounds to the total moles of the hydrogen bond acceptor compounds in each deep eutectic solvent may be from 0.1 to 1.0. The drilling fluid may have a density greater than or equal to 200 $kg/m^3$. The drilling fluid may have a viscosity greater than or equal to 0.5 Pa·s when measured at 25° C.

Additional features and advantages of the technology described in the present disclosure will be set forth in the detailed description that follows, and in part will be readily apparent to those skilled in the art from the description or recognized by practicing the technology as described in this disclosure, including the detailed description that follows, as well as the claims.

DETAILED DESCRIPTION

The present disclosure is directed to drilling fluids comprising deep eutectic solvents and methods for drilling wells in subterranean formations using such drilling fluids. A subterranean formation is the fundamental unit of lithostratigraphy. As used in the present disclosure, the term "subterranean formation" refers to any geological area under the surface of the Earth, either under land or under water. In some embodiments, a subterranean formation may be a body of rock that is sufficiently distinctive from the surrounding bodies of rock such that the body of rock can be mapped as a distinct entity. Subterranean formations are homogenous and form single identifiable units having similar geological properties throughout the unit, such as porosity and permeability. Subterranean formations may comprise different regions, where some regions comprise hydrocarbons and others do not. Production wells may be drilled to extract hydrocarbons from the hydrocarbon-bearing regions of subterranean formations. The wellbores of production wells connect the hydrocarbon-bearing regions of subterranean formations to the surface and enable hydrocarbons to travel from the subterranean formation to the surface. As used in the present disclosure, the term "wellbore" refers to the drilled hole of a well, which includes the openhole, or uncased portion of the well.

The two primary methods for drilling a well in a subterranean formation are rotary drilling and cable-tool drilling. During rotary drilling of a well, a drill bit is inserted into a pre-drilled hole and rotated to break, crush, or cut the rock at the bottom of the hole to form the well. Drilling fluids, also referred to as drilling muds, are pumped down through a drill string to the drill bit and are recirculated back to the surface, which functions to lift and remove pieces of rock, also referred to as cuttings, produced during drilling from the bottom of the well. Drilling fluids commonly serve additional functions during drilling, such as providing hydrostatic pressure sufficient to support the sidewalls of the well, which prevents the sidewalls from collapsing and caving in on the drill string and prevents fluids present in the subterranean formation from flowing into the well during drilling.

Common classifications of drilling fluids include water-based and oil-based drilling fluids. As used in the present disclosure, the term "water-based drilling fluids" refers to drilling fluids comprising water as the major constituent and the term "oil-based drilling fluids" refers to drilling fluids comprising oil as the major constituent. Water-based and oil-based drilling fluids generally comprise an aqueous or oleaginous base fluid and a plurality of additives, such as bridging materials, clay stabilizers, emulsifiers, fluid loss control materials, and weighting materials. These drilling fluids are complex mixtures that are typically formulated on-site based on the specific properties of the subterranean formation and require significant logistical support. Moreover, while the additives used to formulate the drilling fluids may be useful to tailor the properties as desired, the resulting increased solids content (that is, greater than 15 wt. % based on the total weight of the drilling fluid) may result in pipes becoming stuck during drilling operations, a reduction in the strength of the subterranean formation, a reduction in the rate of penetration of the drill bit, or combinations of these.

One or more embodiments of the present disclosure are directed to drilling fluids comprising deep eutectic solvents. As used in the present disclosure, the term "deep eutectic solvent" refers to chemical systems comprising at least one hydrogen bond acceptor compound and at least one hydrogen bond donor compound, which are capable of self-association via hydrogen bond interactions to form a eutectic system having a melting point less than the melting points of the individual compounds. The use of deep eutectic solvents may allow for the tailoring of the properties of the drilling fluid using as little as two major components. In particular, the hydrogen bond interactions may vary between different hydrogen bond donor compounds and hydrogen bond acceptor compounds, resulting in the formation of a wide variety of eutectic systems. This variation in hydrogen bond interactions and formation of different eutectic systems may be utilized to produce fluids with the properties necessary to operate as drilling fluids by adjusting the amounts of only hydrogen bond donor compounds and hydrogen bond acceptor compounds. This may allow for a simplified preparation process and the quick and efficient formulation of the drilling fluid on-site of the drilling operations. This may also allow for the formulation of drilling fluids without the use of solid additives (or at least with reduced solid additives) and, as a result, reduce the negative effects resulting from increased solids content in the drilling fluid.

The drilling fluids of the present disclosure may comprise one or more deep eutectic solvents. Deep eutectic solvents may comprise at least one hydrogen bond acceptor compound and at least one hydrogen bond donor compound. Deep eutectic solvents may be classified as organic deep eutectic solvents or inorganic deep eutectic solvents. Organic deep eutectic solvents generally comprise at least one organic salt as the hydrogen bond acceptor compound, whereas inorganic deep eutectic solvents generally comprise at least one metallic salt as the hydrogen bond acceptor compound.

Suitable organic salts may comprise quaternary ammonium salts, phosphonium salts, sulfonium salts, pyridinium salts, or combinations of these. For example, a suitable hydrogen bond acceptor compound may have the chemical structure of Formula (I):

$$R^1R^2R^3R^4NX \qquad \text{Formula (I)}$$

In Formula (I), $R^2$, $R^3$, and $R^4$ may each independently be hydrogen, a hydrocarbon substituent, such as an alkane, an alkene, an alkyne, or an aromatic, a hydroxyl group, a thiol, an amine, an amide, or combinations of these. In Formula (I), X may be a chloride group, a bromide group, an iodide group, a fluoride group, a hydroxyl group, or combinations of these.

Suitable metallic salts may have the chemical structure of Formula (II):

$$MX_n \qquad \text{Formula (II)}$$

In Formula (II), M may be an alkali metal, such as lithium, sodium, or potassium, an alkaline earth metal, such as magnesium or calcium, a transition metal, such as iron, or combinations of these. In Formula (II), X may be a chloride group, a bromide group, an iodide group, a fluoride group, a hydroxyl group, or combinations of these.

Suitable hydrogen bond donor compounds may comprise organic acids, such as benzoic acid, citric acid, oxalic acid, malonic acid, octanoic acid, dodecanoic acid, palmtic acid, lauric acid, myristic acid, adipic acid, acetic acid, phenylacetic acid, propionic acid, phenylpropionic acid, succinic acid, or lactic acid, glycol compounds, such as glycerol, ethylene glycol, propanol, ethanol, sucrose, glucose, hexanol, or octanol, carboxamides, such as urea, thiourea, acetamide, or benzamide, or combinations of these.

Deep eutectic solvents may comprise at least one hydrogen bond acceptor compound and at least one hydrogen bond donor compound in amounts sufficient to form a eutectic system having a melting point less than the melting points of the hydrogen bond acceptor compounds and hydrogen bond donor compounds. In embodiments, the molar ratio of the hydrogen bond donor compounds to the hydrogen bond acceptor compounds may be from 0.5 to 10. For example, the molar ratio of the hydrogen bond donor compounds to the hydrogen bond acceptor compounds may be from 0.5 to 9, from 0.5 to 8, from 0.5 to 7, from 0.5 to 6, from 0.5 to 5, from 0.5 to 4, from 0.5 to 3, from 0.5 to 2, from 0.5 to 1, from 1 to 10, from 1 to 9, from 1 to 8, from 1 to 7, from 1 to 6, from 1 to 5, from 1 to 4, from 1 to 3, from 1 to 2, from 2 to 10, from 2 to 9, from 2 to 8, from 2 to 7, from 2 to 6, from 2 to 5, from 2 to 4, from 2 to 3, from 3 to 10, from 3 to 9, from 3 to 8, from 3 to 7, from 3 to 6, from 3 to 5, from 3 to 4, from 4 to 10, from 4 to 9, from 4 to 8, from 4 to 7, from 4 to 6, from 4 to 5, from 5 to 10, from 5 to 9, from 5 to 8, from 5 to 7, from 5 to 6, from 6 to 10, from 6 to 9, from 6 to 8, from 6 to 7, from 7 to 10, from 7 to 9, from 7 to 8, from 8 to 10, from 8 to 9, or from 9 to 10. When the molar ratio of the hydrogen bond donor compounds to the hydrogen bond acceptor compounds is less than 0.5, the deep eutectic solvent may not comprise sufficient amounts of the hydrogen bond donor compounds to form complexes with the hydrogen bond acceptor compounds and form a eutectic system. When the molar ratio of the hydrogen bond donor compounds to the hydrogen bond acceptor compounds is greater than 10, the deep eutectic solvent may be unnecessarily diluted with hydrogen bond donor compounds.

The deep eutectic solvents of the present application may be produced via the dry blending, also referred to as solid-state mixing, of at least one hydrogen bond donor compound and at least one hydrogen bond acceptor compound. As used in the present disclosure, the term "dry blending" or "solid-state mixing" refers to the mixing or combining of two or more compounds in an environment substantially free of liquids. The deep eutectic solvents may be dry blended at a temperature of from 0° C. to 200° C. for example, the deep eutectic solvents may be dry blended at a temperature of from 0° C. to 100° C., from 0° C. to 80° C., from 0° C. to 50° C., from 0° C. to 25° C., from 25° C. to 200° C., from 25° C. to 100° C., from 25° C. to 80° C., from 25° C. to 50° C., from 50° C. to 200° C., from 50° C. to 100° C., from 50° C. to 80° C., from 80° C. to 200° C., from 80° C. to 100° C., or from 100° C. to 200° C. The deep eutectic solvents may be dry blended for a time from 5 minutes to 1,440 minutes. For example, the deep eutectic solvents may be dry blended for a time from 5 minutes to 720 minutes, from 5 minutes to 360 minutes, from 5 minutes to 240 minutes, from 5 minutes to 60 minutes, from 60 minutes to 1,440 minutes, from 60 minutes to 720 minutes, from 60 minutes to 360 minutes, from 60 minutes to 240 minutes, from 240 minutes to 1,440 minutes, from 240 minutes to 720 minutes, from 240 minutes to 360 minutes, from 360 minutes to 1,440 minutes, from 360 minutes to 720 minutes, or from 720 minutes to 1,440 minutes. The deep eutectic solvents may be dry blended at an atmospheric pressure or may be dry blended under elevated pressures, such as from 0 kilopascals (kPa) to 10,000 kPa, from 0 kPa to 5,000 kPa, from 0 kPa to 3,000 kPa, from 0 kPa to 2,500 kPa, from 0 kPa to 1,000 kPa, from 1,000 kPa to 10,000 kPa, from 1,000 kPa to 5,000 kPa, from 1,000 kPa to 3,000 kPa, from 1,000 kPa to 2,500 kPa, from 2,500 kPa to 10,000 kPa, from 2,500 kPa to 5,000 kPa, from 2,500 kPa to 3,000 kPa, from 3,000 kPa to 10,000 kPa, from 3,000 kPa to 5,000 kPa, or from 5,000 kPa to 10,000 kPa.

Drilling fluids of the present disclosure may comprise one or more deep eutectic solvents in an amount greater than or equal to 70 wt. % based on the total weight of the drilling fluid. For example, the drilling fluids of the present disclosure may comprise one or more deep eutectic solvents in an amount from 70 wt. % to 100 wt. %, from 70 wt. % to 95 wt. %, from 70 wt. % to 90 wt. %, from 70 wt. % to 85 wt. %, from 70 wt. % to 80 wt. %, from 70 wt. % to 75 wt. %, from 75 wt. % to 100 wt. %, from 75 wt. % to 95 wt. %, from 75 wt. % to 90 wt. %, from 75 wt. % to 85 wt. %, from 75 wt. % to 80 wt. %, from 80 wt. % to 100 wt. %, from 80 wt. % to 95 wt. %, from 80 wt. % to 90 wt. %, from 80 wt. % to 85 wt. %, from 85 wt. % to 100 wt. %, from 85 wt. % to 95 wt. %, from 85 wt. % to 90 wt. %, from 90 wt. % to 100 wt. %, from 90 wt. % to 95 wt. %, or from 95 wt. % to 100 wt. % based on the total weight of the drilling fluid. If two or more deep eutectic solvents are used, the total amount of these two deep eutectic solvents, in combination, may be in the ranges disclosed, such as at least 70 wt. %.

The drilling fluids of the present disclosure may comprise an aqueous fluid. As used in the present disclosure, the term "aqueous" refers to fluids or solutions comprising water as the major constituent. The aqueous fluid may comprise fresh water, salt water, brine, municipal water, formation water, produced water, well water, filtered water, distilled water, seawater, or combinations of these. Without being bound by any particular theory, it is believed aqueous fluids incorporating salt or other organic compounds, such as brine, may be suitable to control the density of the drilling fluid. For example, increasing the saturation of the aqueous fluid by increasing the concentration of salt or other organic compounds in the aqueous base fluid may increase the density of the drilling fluid. Suitable salts may comprise alkali metal chlorides, hydroxides, formats, carboxylates, or combinations of these. For example, the aqueous fluid may comprise sodium, calcium, cesium, zinc, aluminum, magnesium, potassium, strontium, silicon, lithium, chlorides, bromides, carbonates, iodides, chlorates, bromates, formates, nitrates, sulfates, phosphates, oxides, fluorides, or combinations of these. The drilling fluids of the present disclosure may comprise an aqueous fluid in an amount sufficient to achieve a suitable viscosity. In embodiments, the drilling fluids of the present disclosure may comprise an aqueous fluid in an amount from 0 wt. % to 15 wt. %. For example, the drilling fluids of the present disclosure may comprise an aqueous fluid in an amount from 0 wt. % to 10 wt. %, from 0 wt. % to 5 wt. %, from 0 wt. % to 0.5 wt. %, from 0.5 wt. % to 15 wt. %, from 0.5 wt. % to 10 wt. %, from 0.5 wt. % to 5 wt. %, from 5 wt. % to 15 wt. %, from 5 wt. % to 10 wt. %, or from 10 wt. % to 15 wt. %. However, the amount of aqueous fluid may depend on the desired viscosity of the drilling fluid, as well as the viscosity and compositions of the one or more deep eutectic solvents in the drilling fluid.

The drilling fluids of the present disclosure may comprise a viscosifier, also referred to as a rheology modifier. Viscosifiers may impart non-Newtonian fluid rheology to the drilling fluid, create a flat viscosity profile of the drilling fluid in annular flow, or both. This may facilitate the lifting and conveying of cuttings from the bottom of the well to the surface during drilling operations. Suitable viscosifier may comprise biopolymers, such as cellulose derivatives or polysaccharide derivatives, synthetic polymers, such as acrylate polymers or glycol-based block copolymers, layered materials, such as bentonite, hectorite, or magnesium silicate, clay minerals, such as aluminosilicates, or combinations of these. The drilling fluids of the present disclosure may comprise a viscosifier in an amount sufficient to impart non-Newtonian fluid rheology to the drilling fluid, create a flat viscosity profile of the drilling fluid in annular flow, or both. In embodiments, the drilling fluids of the present disclosure may comprise a viscosifier in an amount from 0.01 wt. % to 10 wt. %. For example, the drilling fluids of the present disclosure may comprise a viscosifier in an amount from 0.01 wt. % to 5 wt. %, from 0.01 wt. % to 2 wt. %, from 0.01 wt. % to 0.2 wt. %, from 0.01 wt. % to 0.1 wt. %, from 0.1 wt. % to 10 wt. %, from 0.1 wt. % to 5 wt. %, from 0.1 wt. % to 2 wt. %, from 0.1 wt. % to 0.2 wt. %, from 0.2 wt. % to 10 wt. %, from 0.2 wt. % to 5 wt. %, from 0.2 wt. % to 2 wt. %, from 2 wt. % to 10 wt. %, from 2 wt. % to 5 wt. %, or from 5 wt. % to 10 wt. %. However, the amount of viscosifer may depend on the desired viscosity of the drilling fluid, as well as the viscosity and compositions of the one or more deep eutectic solvents in the drilling fluid.

As mentioned previously, the drilling fluids of the present disclosure may present various benefits compared to conventional drilling fluids due in part to a reduced solids content. While these solid particles may be useful to achieve suitable drilling fluid properties, such as density and viscosity, they may also result in pipes becoming stuck during drilling operations, a reduction in the strength of the subterranean formation, reduce the rate of penetration of the drill bit, or combinations of these. Accordingly, in embodiments the drilling fluid may have a solids content less than 15 wt. % based on the total weight of the drilling fluid. For example, the drilling fluid may have a solids content from 1 wt. % to 15 wt. %, from 1 wt. % to 12 wt. %, from 1 wt. % to 10 wt. %, from 1 wt. % to 8 wt. %, from 1 wt. % to 6 wt. %, from 1 wt. % to 4 wt. %, from 1 wt. % to 2 wt. %, from 2 wt. % to 15 wt. %, from 2 wt. % to 12 wt. %, from 2 wt. % to 10 wt. %, from 2 wt. % to 8 wt. %, from 2 wt. % to 6 wt. %, from 2 wt. % to 4 wt. %, from 4 wt. % to 15 wt. %, from 4 wt. % to 12 wt. %, from 4 wt. % to 10 wt. %, from 4 wt. % to 8 wt. %, from 4 wt. % to 6 wt. %, from 6 wt. % to 15 wt. %, from 6 wt. % to 12 wt. %, from 6 wt. % to 10 wt. %, from 6 wt. % to 8 wt. %, from 8 wt. % to 15 wt. %, from 8 wt. % to 12 wt. %, from 8 wt. % to 10 wt. %, from 10 wt. % to 15 wt. %, from 10 wt. % to 12 wt. %, or from 12 wt. % to 15 wt. % based on the total weight of the drilling fluid. In embodiments, the drilling fluid may be substantially free of solids. As used in the present disclosure, the term "substantially free" of a material refers to a particular mixture, such as the drilling fluid, that comprises less than 1 wt. % of the material. For example, the drilling fluid, which may be substantially free of solids, may comprise less than 1 wt. %, less than 0.9 wt. %, less than 0.8 wt. %, less than 0.7 wt. %, less than 0.6 wt. %, less than 0.5 wt. %, less than 0.4 wt. %, less than 0.3 wt. %, less than 0.2 wt. %, or less than 0.1 wt. % of solids based on the total weight of the drilling fluid. It should be understood that the solids content of the drilling fluid will naturally increase during the course of a drilling operation, as the drilling fluid will convey cuttings produced by the drilling operation. However, such solids are not included when determining that solids content of the drilling fluid. That is, as used in the present disclosure, the term "solids content" refers to the amount of solid particles added to the drilling fluid prior to any use in one or more drilling operations.

The drilling fluids of the present disclosure may be formulated to have specific characteristics, such as a specific viscosity and density, sufficient for the drilling fluids to be suitable for use during drilling operations. For example, the drilling fluid may be formulated to have a density in a range suitable to provide the necessary hydrostatic pressure to support the sidewalls of the wellbore and prevent fluids in the formation from flowing into the wellbore. Additionally, the drilling fluid may be formulated to have viscosity in a range suitable to allow the drilling fluid to be pumped down through the drill string while still capturing and conveying cuttings from the bottom of the well. To accomplish these functions, the composition of the drilling fluid may be adjusted, such as by adjusting the amounts of the hydrogen bond acceptor compounds, the hydrogen bond donor compounds, the aqueous fluid, the viscosifier, or combinations of these.

The drilling fluids of the present disclosure may have a viscosity suitable to allow the drilling fluid to be pumped down through the drill string while still capturing and conveying cuttings from the bottom of the well. In embodiments, the drilling fluids of the present disclosure may have a viscosity greater than or equal to 0.5 pascal-seconds (Pa·s) when measured at 25° C. For example, the drilling fluids of the present disclosure may have a viscosity from 0.5 Pa·s to 7.5 Pa·s, from 0.5 Pa·s to 6.5 Pa·s, from 0.5 Pa·s to 5.5 Pa·s, from 0.5 Pa·s to 4.5 Pa·s, from 0.5 Pa·s to 3.5 Pa·s, from 0.5 Pa·s to 2.5 Pa·s, from 0.5 Pa·s to 1.5 Pa·s, from 1.5 Pa·s to 7.5 Pa·s, from 1.5 Pa·s to 6.5 Pa·s, from 1.5 Pa·s to 5.5 Pa·s, from 1.5 Pa·s to 4.5 Pa·s, from 1.5 Pa·s to 3.5 Pa·s, from 1.5 Pa·s to 2.5 Pa·s, from 2.5 Pa·s to 7.5 Pa·s, from 2.5 Pa·s to 6.5 Pa·s, from 2.5 Pa·s to 5.5 Pa·s, from 2.5 Pa·s to 4.5 Pa·s, from 2.5 Pa·s to 3.5 Pa·s, from 3.5 Pa·s to 7.5 Pa·s, from 3.5 Pa·s to 6.5 Pa·s, from 3.5 Pa·s to 5.5 Pa·s, from 3.5 Pa·s to 4.5 Pa·s, from 4.5 Pa·s to 7.5 Pa·s, from 4.5 Pa·s to 6.5 Pa·s, from 4.5 Pa·s to 5.5 Pa·s, from 5.5 Pa·s to 7.5 Pa·s, from 5.5 Pa·s to 6.5 Pa·s, or from 6.5 Pa·s to 7.5 Pa·s when measured at 25° C. When the drilling fluid has a viscosity less than 0.5 Pa·s, the drilling fluid may not have a viscosity sufficient to capture and convey cuttings from the bottom of the well. When the drilling fluid has a viscosity greater than 7.5 Pa·s, the drilling fluid may have a viscosity too great to allow the drilling fluid to be pumped down through the drill string.

In embodiments, the drilling fluids of the present disclosure may have a viscosity greater than or equal to 0.050 Pa·s when measured at 50° C. For example, the drilling fluids of the present disclosure may have a viscosity from 0.050 Pa·s to 1.0 Pa·s, from 0.050 Pa·s to 0.90 Pa·s, from 0.050 Pa·s to 0.80 Pa·s, from 0.050 Pa·s to 0.70 Pa·s, from 0.050 Pa·s to 0.60 Pa·s, from 0.050 Pa·s to 0.50 Pa·s, from 0.050 Pa·s to 0.40 Pa·s, from 0.050 Pa·s to 0.30 Pa·s, from 0.050 Pa·s to 0.20 Pa·s, from 0.050 Pa·s to 0.10 Pa·s, from 0.10 Pa·s to 1.0 Pa·s, from 0.10 Pa·s to 0.90 Pa·s, from 0.10 Pa·s to 0.80 Pa·s, from 0.10 Pa·s to 0.70 Pa·s, from 0.10 Pa·s to 0.60 Pa·s, from 0.10 Pa·s to 0.50 Pa·s, from 0.10 Pa·s to 0.40 Pa·s, from 0.10 Pa·s to 0.30 Pa·s, from 0.10 Pa·s to 0.20 Pa·s, from 0.20 Pa·s to 1.0 Pa·s, from 0.20 Pa·s to 0.90 Pa·s, from 0.20 Pa·s to 0.80 Pa·s, from 0.20 Pa·s to 0.70 Pa·s, from 0.20 Pa·s to 0.60 Pa·s, from 0.20 Pa·s to 0.50 Pa·s, from 0.20 Pa·s to 0.40 Pa·s, from 0.20 Pa·s to 0.30 Pa·s, from 0.30 Pa·s to 1.0 Pa·s, from 0.30 Pa·s to 0.90 Pa·s, from 0.30 Pa·s to 0.80 Pa·s, from 0.30 Pa·s to 0.70 Pa·s, from 0.30 Pa·s to 0.60 Pa·s, from 0.30 Pa·s to 0.50 Pa·s, from 0.30 Pa·s to 0.40 Pa·s, from 0.40 Pa·s to 1.0 Pa·s, from 0.40 Pa·s to 0.90 Pa·s, from 0.40 Pa·s to 0.80 Pa·s, from 0.40 Pa·s to 0.70 Pa·s, from 0.40 Pa·s to 0.60 Pa·s, from 0.40 Pa·s to 0.50 Pa·s, from 0.50 Pa·s to 1.0 Pa·s, from 0.50 Pa·s to 0.90 Pa·s, from 0.50 Pa·s to 0.80 Pa·s, from 0.50 Pa·s to 0.70 Pa·s, from 0.50 Pa·s to 0.60 Pa·s, from 0.60 Pa·s to 1.0 Pa·s, from 0.60 Pa·s to 0.90 Pa·s, from 0.60 Pa·s to 0.80 Pa·s, from 0.60 Pa·s to 0.70 Pa·s, from 0.70 Pa·s to 1.0 Pa·s, from 0.70 Pa·s to 0.90 Pa·s, from 0.70 Pa·s to 0.80 Pa·s, from 0.80 Pa·s to 1.0 Pa·s, from 0.80 Pa·s to 0.90 Pa·s, or from 0.90 Pa·s to 1.0 Pa·s when measured at 50° C. In embodiments, the drilling fluids of the present disclosure may have a viscosity greater than or equal to 0.010 Pa·s when measured at 75° C. For example, the drilling fluids of the present disclosure may have a viscosity from 0.010 Pa·s to 0.50 Pa·s, from 0.010 Pa·s to 0.40 Pa·s, from 0.010 Pa·s to 0.30 Pa·s, from 0.010 Pa·s to 0.20 Pa·s, from 0.010 Pa·s to 0.10 Pa·s, from 0.10 Pa·s to 0.50 Pa·s, from 0.10 Pa·s to 0.40 Pa·s, from 0.10 Pa·s to 0.30 Pa·s, from 0.10 Pa·s to 0.20 Pa·s, from 0.20 Pa·s to 0.50 Pa·s, from 0.20 Pa·s to 0.40 Pa·s, from 0.20 Pa·s to 0.30 Pa·s, from 0.30 Pa·s to 0.50 Pa·s, from 0.30 Pa·s to 0.40 Pa·s, or from 0.40 Pa·s to 0.50 Pa·s when measured at 75° C. In embodiments, the drilling fluids of the present disclosure may have a viscosity greater than or equal to 0.0010 Pa·s when measured at 100° C. For example, the drilling fluids of the present disclosure may have a viscosity from 0.0010 Pa·s to 0.010 Pa·s, from 0.0010 Pa·s to 0.0090 Pa·s, from 0.0010 Pa·s to 0.0080 Pa·s, from 0.0010 Pa·s to 0.0070 Pa·s, from 0.0010 Pa·s to 0.0060 Pa·s, from 0.0010 Pa·s to 0.0050 Pa·s, from 0.0010 Pa·s to 0.0040 Pa·s, from 0.0010 Pa·s to 0.0030 Pa·s, from 0.0010 Pa·s to 0.0020 Pa·s, from 0.0020 Pa·s to 0.010 Pa·s, from 0.0020 Pa·s to 0.0090 Pa·s, from 0.0020 Pa·s to 0.0080 Pa·s, from 0.0020 Pa·s to 0.0070 Pa·s, from 0.0020 Pa·s to 0.0060 Pa·s, from 0.0020 Pa·s to 0.0050 Pa·s, from 0.0020 Pa·s to 0.0040 Pa·s, from 0.0020 Pa·s to 0.0030 Pa·s, from 0.0030 Pa·s to 0.010 Pa·s, from 0.0030 Pa·s to 0.0090 Pa·s, from 0.0030 Pa·s to 0.0080 Pa·s, from 0.0030 Pa·s to 0.0070 Pa·s, from 0.0030 Pa·s to 0.0060 Pa·s, from 0.0030 Pa·s to 0.0050 Pa·s, from 0.0030 Pa·s to 0.0040 Pa·s, from 0.0040 Pa·s to 0.010 Pa·s, from 0.0040 Pa·s to 0.0090 Pa·s, from 0.0040 Pa·s to 0.0080 Pa·s, from 0.0040 Pa·s to 0.0070 Pa·s, from 0.0040 Pa·s to 0.0060 Pa·s, from 0.0040 Pa·s to 0.0050 Pa·s, from 0.0050 Pa·s to 0.010 Pa·s, from 0.0050 Pa·s to 0.0090 Pa·s, from 0.0050 Pa·s to 0.0080 Pa·s, from 0.0050 Pa·s to 0.0070 Pa·s, from 0.0050 Pa·s to 0.0060 Pa·s, from 0.0060 Pa·s to 0.010 Pa·s, from 0.0060 Pa·s to 0.0090 Pa·s, from 0.0060 Pa·s to 0.0080 Pa·s, from 0.0060 Pa·s to 0.0070 Pa·s, from 0.0070 Pa·s to 0.010 Pa·s, from 0.0070 Pa·s to 0.0090 Pa·s, from 0.0070 Pa·s to 0.0080 Pa·s, from 0.0080 Pa·s to 0.010 Pa·s, from 0.0080 Pa·s to 0.0090 Pa·s, or from 0.0090 Pa·s to 0.010 Pa·s when measured at 100° C. When the viscosity of the drilling fluid decreases significantly at greater temperatures, such as when the viscosity is suitable (for example, from 0.5 Pa·s to 7.5 Pa·s) when measured at 25° C. and less than 0.050 Pa·s when measured at 50° C., the drilling fluid may not be suitable for drilling operations as the drilling fluid will not be able to maintain a sufficient viscosity when exposed to greater temperatures, such as those that may be encountered at the bottom of the well.

The drilling fluids of the present disclosure may have a density suitable to provide the necessary hydrostatic pressure to support the sidewalls of the wellbore, prevent fluids in the subterranean formation from flowing into the wellbore, or both. In embodiments, the drilling fluids of the present disclosure may have a density greater than or equal to 200 kg/m$^3$. For example, the drilling fluids of the present disclosure may have a density from 200 kg/m$^3$ to 2,500 kg/m$^3$, from 200 kg/m$^3$ to 2,000 kg/m$^3$, from 200 kg/m$^3$ to 1,500 kg/m$^3$, from 200 kg/m$^3$ to 1,000 kg/m$^3$, from 200 kg/m$^3$ to 500 kg/m$^3$, from 500 kg/m$^3$ to 2,500 kg/m$^3$, from 500 kg/m$^3$ to 2,000 kg/m$^3$, from 500 kg/m$^3$ to 1,500 kg/m$^3$, from 500 kg/m$^3$ to 1,000 kg/m$^3$, from 1,000 kg/m$^3$ to 2,500 kg/m$^3$, from 1,000 kg/m$^3$ to 2,000 kg/m$^3$, from 1,000 kg/m$^3$ to 1,500 kg/m$^3$, from 1,500 kg/m$^3$ to 2,500 kg/m$^3$, from 1,500 kg/m$^3$ to 2,000 kg/m$^3$, or from 2,000 kg/m$^3$ to 2,500 kg/m$^3$. When the drilling fluid has a density less than 200 kg/m$^3$, the drilling fluid may not have a density sufficient to provide the necessary hydrostatic pressure to support the sidewalls of the wellbore, prevent fluids in the subterranean formation from flowing into the wellbore, or both.

The rheology of the drilling fluid may be determined by measuring the shear stress on the drilling fluid at different shear rates. The various shear rates are utilized since drilling fluids behave as a rigid body at lesser shear stresses but flow as a viscous fluid at greater shear stresses. The rheology of the drilling fluid may be characterized by the plastic viscosity (PV) and the yield point (YP), which are parameters from the Bingham plastic rheology model. The plastic viscosity is related to the resistance of a drilling fluid to flow due to mechanical interaction between solids, such as fines, in the drilling fluid. The plastic viscosity represents the viscosity of the drilling fluid extrapolated to infinite shear rate. The plastic viscosity is expressed in centipoise (cP). The plastic viscosity reflects the type and concentration of the solids in the hydraulic fracturing fluid. The plastic viscosity of a drilling fluid may be estimated by measuring the shear stress of the drilling fluid using the a rheometer at spindle speeds of 300 rotations per minute (rpm) and 600 rpm and subtracting the 300 rpm dial reading from the 600 rpm dial reading according to Equation (I):

$$PV \text{ (cP)} = \text{(Dial Reading at 600 rpm)} - \text{(Dial Reading at 300 rpm)} \qquad \text{Equation (I)}$$

In embodiments, the drilling fluid may have a plastic viscosity of from 1 cP to 100 cP. For example, the drilling fluid may have a plastic viscosity of from 1 cP to 100 cP, from 1 cP to 89 cP, from 1 cP to 78 cP, from 1 cP to 67 cP, from 1 cP to 56 cP, from 1 cP to 45 cP, from 1 cP to 34 cP, from 1 cP to 23 cP, from 1 cP to 12 cP, from 12 cP to 100 cP, from 12 cP to 89 cP, from 12 cP to 78 cP, from 12 cP to 67 cP, from 12 cP to 56 cP, from 12 cP to 45 cP, from 12 cP to 34 cP, from 12 cP to 23 cP, from 23 cP to 100 cP, from 23 cP to 89 cP, from 23 cP to 78 cP, from 23 cP to 67 cP, from 23 cP to 56 cP, from 23 cP to 45 cP, from 23 cP to 34 cP, from 34 cP to 100 cP, from 34 cP to 89 cP, from 34 cP to 78 cP, from 34 cP to 67 cP, from 34 cP to 56 cP, from 34 cP to 45 cP, from 45 cP to 100 cP, from 45 cP to 89 cP, from 45 cP to 78 cP, from 45 cP to 67 cP, from 45 cP to 56 cP, from 56 cP to 100 cP, from 56 cP to 89 cP, from 56 cP to 78 cP, from 56 cP to 67 cP, from 67 cP to 100 cP, from 67 cP to 89 cP, from 67 cP to 78 cP, from 78 cP to 100 cP, from 78 cP to 89 cP, or from 89 cP to 100 cP.

Drilling fluids may behave as a rigid body when the shear stress is less than the yield point, and drilling fluids may flow as a viscous fluid when the shear stress is greater than the yield point. In other words, the yield point represents the amount of stress required to move the drilling fluid from a static condition. The yield point of a drilling fluid is expressed as a force per area, such as pounds of force per one hundred square feet (lbf/100 ft$^2$). Yield point provides an indication of the ability of a drilling fluid to carry solids, such as cuttings through the annulus, which, in simplified terms, gives an indication of the ability of a drilling fluid to lift cuttings away from the bottom of the subterranean formation. The yield point of a drilling fluid is determined by extrapolating the Bingham plastic rheology model to a shear rate of zero. The yield point of a drilling fluid may be estimated from the plastic viscosity of the drilling fluid (as measured in accordance with Equation 2, as previously described) according to Equation (II):

$$YP = \text{(Dial Reading at 300 rpm)} - PV \qquad \text{Equation (II)}$$

In embodiments, the drilling fluid may have a yield point of from 1 lbf/100 ft$^2$ to 60 lbf/100 ft$^2$. For example, the drilling fluid may have a yield point of from 1 lbf/100 ft$^2$ to 60 lbf/100 ft$^2$, from 1 lbf/100 ft$^2$ to 50 lbf/100 ft$^2$, from 1 lbf/100 ft$^2$ to 40 lbf/100 ft$^2$, from 1 lbf/100 ft$^2$ to 30 lbf/100 ft$^2$, from 1 lbf/100 ft$^2$ to 20 lbf/100 ft$^2$, from 1 lbf/100 ft$^2$ to 10 lbf/100 ft$^2$, from 10 lbf/100 ft$^2$ to 60 lbf/100 ft$^2$, from 10 lbf/100 ft$^2$ to 50 lbf/100 ft$^2$, from 10 lbf/100 ft$^2$ to 40 lbf/100 ft$^2$, from 10 lbf/100 ft$^2$ to 30 lbf/100 ft$^2$, from 10 lbf/100 ft$^2$ to 20 lbf/100 ft$^2$, from 20 lbf/100 ft$^2$ to 60 lbf/100 ft$^2$, from 20 lbf/100 ft$^2$ to 50 lbf/100 ft$^2$, from 20 lbf/100 ft$^2$ to 40 lbf/100 ft$^2$, from 20 lbf/100 ft$^2$ to 30 lbf/100 ft$^2$, from 30 lbf/100 ft$^2$ to 60 lbf/100 ft$^2$, from 30 lbf/100 ft$^2$ to 50 lbf/100 ft$^2$, from 30 lbf/100 ft$^2$ to 40 lbf/100 ft$^2$, from 40 lbf/100 ft$^2$ to 60 lbf/100 ft$^2$, from 40 lbf/100 ft$^2$ to 50 lbf/100 ft$^2$, or from 50 lbf/100 ft$^2$ to 60 lbf/100 ft$^2$.

The present disclosure is also directed to the use of the drilling fluid in drilling operations, such as drilling a subterranean well. Accordingly, methods for drilling a subterranean well may include operating a drill in a subterranean formation in the presence of a drilling fluid. The drilling fluid may be in accordance with any of the embodiments previously described. In embodiments, the drilling fluid may be introduced into the subterranean formation. Introducing may involve injecting the drilling fluid into the subterranean formation. In embodiments, the drilling fluid may be injected through a drill string of the drill to a drill bit. In embodiments, the subterranean formation may be a well. The drilling fluid may at least be partially circulated within the subterranean formation. Recirculating the drilling fluid may allow the drilling fluid to cool and lubricate the drill bit and to lift cuttings away from the drill bit, carrying the cuttings upwards to the surface to clean the wellbore. The drilling fluid may additionally provide hydrostatic pressure to support the sidewalls of the wellbore and prevent the sidewalls from collapsing onto the drill string.

EXAMPLES

The various embodiments of drilling fluids will be further clarified by the following examples. The examples are illustrative in nature, and should not be understood to limit the subject matter of the present disclosure.

Example 1—Formulation of Sample 1

In Example 1, a sample deep eutectic solvent comprising choline chloride as the hydrogen bond acceptor compound and urea as the hydrogen bond donor compound was prepared. First, a mixture comprising measured quantities of the choline chloride (139.6 grams, 1 mole) and urea (120.1 grams, 2 moles) was prepared. The mixture was then heated to a temperature of from 50° C. to 60° C. and stirred for a time of from 4 hours to 5 hours to produce the deep eutectic solvent, which remained a liquid when cooled to room temperature.

Comparative Example 2—Formulation of Sample 2

In Comparative Example 2, a sample deep eutectic solvent comprising choline chloride as the hydrogen bond acceptor compound and glycerol as the hydrogen bond donor compound was prepared. First, a mixture comprising measured quantities of the choline chloride (139.6 grams, 1 mole) and glycerol (184.2 grams, 2 moles) was prepared. The mixture was then heated to a temperature of from 50° C. to 60° C. and stirred for a time of from 4 hours to 5 hours to produce the deep eutectic solvent, which remained a liquid when cooled to room temperature.

Example 3—Formulation of Sample 3

In Example 3, a sample deep eutectic solvent comprising choline chloride as the hydrogen bond acceptor compound and citric acid as the hydrogen bond donor compound was prepared. First, a mixture comprising measured quantities of the choline chloride (139.6 grams, 1 mole) and citric acid (192.1 grams, 1 mole) was prepared. The mixture was then heated to a temperature of from 60° C. to 70° C. and stirred for a time of from 5 hours to 6 hours to produce the deep eutectic solvent, which remained a liquid when cooled to room temperature.

Example 4—Formulation of Sample 4

In Example 4, a sample deep eutectic solvent comprising choline chloride as the hydrogen bond acceptor compound and oxalic acid as the hydrogen bond donor compound was prepared. First, a mixture comprising measured quantities of the choline chloride (139.6 grams, 1 mole) and oxalic acid (90.00 grams, 1 mole) was prepared. The mixture was then heated to a temperature of from 60° C. to 70° C. and stirred for a time of from 5 hours to 6 hours to produce the deep eutectic solvent, which remained a liquid when cooled to room temperature.

Example 5—Formulation of Sample 5

In Example 5, a sample deep eutectic solvent comprising choline chloride as the hydrogen bond acceptor compound and oxalic acid as the hydrogen bond donor compound was prepared. First, a mixture comprising measured quantities of the choline chloride (139.6 grams, 1 mole) and oxalic acid (180.0 grams, 2 mole) was prepared. The mixture was then heated to a temperature of from 60° C. to 70° C. and stirred for a time of from 5 hours to 6 hours to produce the deep eutectic solvent, which remained a liquid when cooled to room temperature.

Example 6—Formulation of Sample 6

In Example 6, a sample deep eutectic solvent comprising ferric chloride as the hydrogen bond acceptor compound and ethylene glycol as the hydrogen bond donor compound was prepared. First, a mixture comprising measured quantities of ferric chloride hexahydrate (270.3 grams, 1 mole) and ethylene glycol (186.3 grams, 3 moles) was prepared. The mixture was then heated to a temperature of from 60° C. to 70° C. and stirred for a time of from 5 hours to 6 hours to produce the deep eutectic solvent, which remained a liquid when cooled to room temperature.

Example 7—Formulation of Sample 7

In Example 7, a sample deep eutectic solvent comprising ferric chloride as the hydrogen bond acceptor compound and both urea and ethylene glycol as hydrogen bond donor compounds was prepared. First, a mixture comprising measured quantities of ferric chloride hexahydrate (270.3 grams, 1 mole), urea (120.1 grams, 2 moles), and ethylene glycol (62.10 grams, 1 mole) was prepared. The mixture was then heated to a temperature of from 60° C. to 70° C. and stirred for a time of from 5 hours to 6 hours to produce the deep eutectic solvent, which remained a liquid when cooled to room temperature.

Example 8—Formulation of Sample 8

In Example 8, a sample deep eutectic solvent comprising ferric chloride as the hydrogen bond acceptor compound and both urea and glycerol as hydrogen bond donor compounds was prepared. First, a mixture comprising measured quantities of ferric chloride hexahydrate (270.3 grams, 1 mole), urea (120.1 grams, 2 moles), and glycerol (60.80 grams, 0.7 moles) was prepared. The mixture was then heated to a temperature of from 60° C. to 70° C. and stirred for a time of from 5 hours to 6 hours to produce the deep eutectic solvent, which remained a liquid when cooled to room temperature.

Example 9—Formulation of Sample 9

In Example 9, a mixture comprising two deep eutectic solvents was prepared. First, a mixture comprising measured quantities of the deep eutectic solvent of Example 1 (18.0 grams) and the deep eutectic solvent of Example 3 (9.00 grams) was prepared. The mixture was then heated to a temperature of from 60° C. to 70° C. and stirred for a time of from 5 hours to 6 hours to produce the mixture of deep eutectic solvents, which remained a liquid when cooled to room temperature.

Example 10—Formulation of Sample 10

In Example 10, a mixture comprising two deep eutectic solvents was prepared. First, a mixture comprising measured quantities of the deep eutectic solvent of Example 1 (18.0 grams) and the deep eutectic solvent of Example 3 (13.5 grams) was prepared. The mixture was then heated to a temperature of from 60° C. to 70° C. and stirred for a time of from 5 hours to 6 hours to produce the mixture of deep eutectic solvents, which remained a liquid when cooled to room temperature.

Example 11—Formulation of Sample 11

In Example 11, a mixture comprising two deep eutectic solvents was prepared. First, a mixture comprising measured quantities of the deep eutectic solvent of Example 1 (75.0 grams) and the deep eutectic solvent of Example 7 (25.0 grams) was prepared. The mixture was then heated to a temperature of from 60° C. to 70° C. and stirred for a time of from 5 hours to 6 hours to produce the mixture of deep eutectic solvents, which remained a liquid when cooled to room temperature.

Example 12—Formulation of Sample 12

In Example 12, a mixture comprising two deep eutectic solvents was prepared. First, a mixture comprising measured quantities of the deep eutectic solvent of Example 1 (50.0 grams) and the deep eutectic solvent of Example 7 (50.0 grams) was prepared. The mixture was then heated to a temperature of from 60° C. to 70° C. and stirred for a time of from 5 hours to 6 hours to produce the mixture of deep eutectic solvents, which remained a liquid when cooled to room temperature.

Example 13—Formulation of Sample 13

In Example 13, a mixture comprising two deep eutectic solvents was prepared. First, a mixture comprising measured quantities of the deep eutectic solvent of Example 1 (25.0 grams) and the deep eutectic solvent of Example 7 (75.0 grams) was prepared. The mixture was then heated to a temperature of from 60° C. to 70° C. and stirred for a time of from 5 hours to 6 hours to produce the mixture of deep eutectic solvents, which remained a liquid when cooled to room temperature.

Example 14 Density of Select Samples

In Example 14, the densities of a selection of the deep eutectic solvents and mixtures of deep eutectic solvents prepared in Examples 1 through 13 were determined by measuring the ratio of the mass of the sample to the volume of the sample. The densities of the selected samples are reported in Table 1. As reported in Table 1, all deep eutectic solvents and mixtures of deep eutectic solvents have densities suitable for use as drilling fluids. Moreover, the densities reported in Table 1 indicate that the density of the deep eutectic solvents may be tailored based on the selection of hydrogen bond donor compounds and hydrogen bond acceptor compounds, as well as the selection of two or more deep eutectic solvents.

TABLE 1

|  | Sample 1 | Sample 2 | Sample 3 | Sample 4 | Sample 7 | Sample 9 |
|---|---|---|---|---|---|---|
| Density (kg/m$^3$) | 987.8 | 977.8 | 1137 | 1098 | 1277 | 1038 |

Example 15—Viscosity of Select Samples

In Example 15, the viscosities of a selection of the deep eutectic solvents and mixtures of deep eutectic solvents prepared in Examples 1 through 13 were determined and are reported in Table 2. The viscosity of each sample was measured once at 25° C., 50° C., 75° C., and 100° C. As reported in Table 2, Samples 1, 9, and 10 each have viscosities suitable for use as drilling fluids. Moreover, similar to the densities reported in Table 1, the viscosities reported in Table 2 indicate that the viscosity of the deep eutectic solvents may be tailored based on the selection of hydrogen bond donor compounds and hydrogen bond acceptor compounds, as well as the selection of two or more deep eutectic solvents. Furthermore, the viscosities reported in Table 2 indicate that while the viscosity of the deep eutectic solvents may decrease as temperatures increase, this thinning effect may be reduced by mixing two or more deep eutectic solvents as opposed to using only one deep eutectic solvent.

TABLE 2

| | Viscosity (Pa · s) | | | |
|---|---|---|---|---|
| | 25° C. | 50° C. | 75° C. | 100° C. |
| Sample 1 | 1.008 | 0.1380 | 0.03850 | 0.01640 |
| Sample 2 | 0.2688 | 0.07110 | 0.02740 | 0.01370 |
| Sample 9 | 3.881 | 0.5940 | 0.1260 | 0.01430 |
| Sample 10 | 6.625 | 0.9130 | 0.2410 | 0.01960 |

Example 16—Rheology of Select Samples

In Example 16, the rheology of Sample 7 prepared in Example 7 was determined by measuring the shear stress of the sample using a coaxial cylinder rotational viscometer (commercially available from Couette). The sample is placed in the annular space, or shear gap, between the cylinders. The drag exerted on the inner cylinder, and the resulting torque, is recorded as a dial reading. This measurement simulates the flow of the drilling fluid during drilling operations. The rheology of the sample is reported in Table 3. As reported in Table 3, Sample 7 has a rheology suitable for use as drilling fluids and maintains this rheology, even at elevated temperatures.

TABLE 3

| | Dial Reading | | | | |
|---|---|---|---|---|---|
| | 25.00° C. | 37.78° C. | 48.89° C. | 60.00° C. | 82.22° C. |
| 600 rpm | >300 | >300 | 154 | 114 | 62 |
| 300 rpm | >300 | 174 | 77 | 57 | 27 |
| 200 rpm | 203 | 114 | 52 | 38 | 13 |
| 100 rpm | 102 | 57 | 27 | 20 | 10 |
| 6 rpm | 7 | 4 | 3 | 3 | 2 |
| 3 rpm | 4 | 4 | 3 | 3 | 2 |

It will be apparent to those skilled in the art that various modifications and variations can be made without departing from the spirit or scope of the disclosure. Since modifications, combinations, sub-combinations and variations of the disclosed embodiments incorporating the spirit and substance of the disclosure may occur to persons skilled in the art, the scope of the disclosure should be construed to include everything within the scope of the appended claims their equivalents.

A first aspect of the present disclosure may comprise a drilling fluid comprising one or more deep eutectic solvents in an amount greater than or equal to 70 wt. % based on the total weight of the drilling fluid, each deep eutectic solvent comprising at least one hydrogen bond acceptor compound and at least one hydrogen bond donor compound, wherein a molar ratio of the total moles of the hydrogen bond donor compounds to the total moles of the hydrogen bond acceptor compounds in each deep eutectic solvent is from 0.1 to 1.0; the drilling fluid has a density greater than or equal to 200 kg/m$^3$; and the drilling fluid has a viscosity greater than or equal to 0.5 Pa·s when measured at 25° C.

A second aspect of the present disclosure may comprise the first aspect, wherein the at least one hydrogen bond acceptor compound comprises one or more of a quaternary ammonium salt, a phosphonium salt, a sulfonium salt, a pyridinium salt, or a metallic salt.

A third aspect of the present disclosure may comprise either the first or second aspect, wherein the at least one hydrogen bond acceptor compound has the chemical structure: $R^1R^2R^3R^4NX$, wherein $R^1$, $R^2$, $R^3$, and $R^4$ are each independently one or more of a hydrogen, an alkane, an alkene, an alkyne, an aromatic, a hydroxyl group, a thiol, an amine, or an amide, and X is one or more of a chloride group, a bromide group, an iodide group, a fluoride group, or a hydroxyl group.

A fourth aspect of the present disclosure may comprise any one of the first through third aspects, wherein the at least one hydrogen bond acceptor compound has the chemical structure: $MX_n$, wherein M is one or more of an alkali metal, an alkaline earth metal, or a transition metal, and X is one or more of a chloride group, a bromide group, an iodide group, a fluoride group, or a hydroxyl group.

A fifth aspect of the present disclosure may comprise any one of the first through fourth aspects, wherein the at least one hydrogen bond donor compound comprises one or more of benzoic acid, citric acid, oxalic acid, malonic acid, octanoic acid, dodecanoic acid, palmtic acid, lauric acid, myristic acid, adipic acid, acetic acid, phenylacetic acid, propionic acid, phenylpropionic acid, succinic acid, lactic acid, glycerol, ethylene glycol, propanol, ethanol, sucrose, glucose, hexanol, octanol, urea, thiourea, acetamide, or benzamide.

A sixth aspect of the present disclosure may comprise any one of the first through fifth aspects, wherein the drilling fluid comprises an aqueous fluid in an amount from 0.5 wt. % to 15 wt. % based on the total weight of the drilling fluid.

A seventh aspect of the present disclosure may comprise any one of the first through sixth aspects, wherein the drilling fluid comprises viscosifier in an amount from 0.01 wt. % to 10 wt. % based on the total weight of the drilling fluid.

An eighth aspect of the present disclosure may comprise any one of the first through seventh aspects, wherein the drilling fluid has a solids content less than 10 wt. % based on the total weight of the drilling fluid.

A ninth aspect of the present disclosure may comprise any one of the first through eighth aspects, wherein the drilling fluid has a density of from 200 kg/m$^3$ to 2,500 kg/m$^3$.

A tenth aspect of the present disclosure may comprise any one of the first through ninth aspects, wherein the drilling fluid has a viscosity of from 0.5 Pa·s to 7.5 Pa·s when measured at 25° C.

An eleventh aspect of the present disclosure may comprise a method for drilling a well in a subterranean formation comprising operating a drill in the subterranean formation in the presence of a drilling fluid, wherein the drilling fluid comprises any one of the first through tenth aspects.

A twelfth aspect of the present disclosure may comprise the eleventh aspect, further comprising introducing the drilling fluid into the subterranean formation.

A thirteenth aspect of the present disclosure may comprise the twelfth aspect, wherein introducing the drilling fluid into the subterranean formation comprises injecting the drilling fluid through a drill string of the drill.

A fourteenth aspect of the present disclosure may comprise any one of the eleventh through thirteenth aspects, further comprising circulating at least a portion of the drilling fluid within the subterranean formation.

A fifteenth aspect of the present disclosure may comprise any one of the eleventh through fourteenth aspects, further comprising preparing the drilling by a method comprising dry mixing the at least one hydrogen bond acceptor compound and the at least one hydrogen bond donor compound to form the one or more deep eutectic solvents.

It should now be understood that various aspects of the drilling fluid compositions and methods for drilling subterranean wells are described and such aspects may be utilized in conjunction with various other aspects.

It should be understood that any two quantitative values assigned to a property may constitute a range of that property, and all combinations of ranges formed from all stated quantitative values of a given property are contemplated in this disclosure.

Having described the subject matter of the present disclosure in detail and by reference to specific embodiments, it is noted that the various details described in this disclosure should not be taken to imply that these details relate to elements that are essential components of the various embodiments described in this disclosure. Rather, the appended claims should be taken as the sole representation of the breadth of the present disclosure and the corresponding scope of the various embodiments described in this disclosure. Further, it will be apparent that modifications and variations are possible without departing from the scope of the appended claims. More specifically, although some aspects of the present disclosure are identified as particularly advantageous, it is contemplated that the present disclosure is not necessarily limited to these aspects.

What is claimed is:

1. A drilling fluid comprising:
one or more deep eutectic solvents in an amount greater than or equal to 70 weight percent based on the total weight of the drilling fluid, each deep eutectic solvent comprising at least one hydrogen bond acceptor compound and at least one hydrogen bond donor compound;
wherein a molar ratio of the total moles of the hydrogen bond donor compounds to the total moles of the hydrogen bond acceptor compounds in each deep eutectic solvent is from 0.1 to 1.0;
wherein the drilling fluid has a density of from 200 kilograms per cubic meter to 1,300 kilograms per cubic meter;
wherein the drilling fluid has a viscosity of from 0.5 pascal-seconds to 7.5 pascal-seconds when measured at 25 degrees Celsius;
wherein one or more of:
the at least one hydrogen bond acceptor compound comprises one or more of a quaternary ammonium salt, a phosphonium salt, a sulfonium salt, a pyridinium salt, or a metallic salt;

the at least one hydrogen bond acceptor compound has the chemical structure: $R^1R^2R^3R^4NX$, wherein $R^1$, $R^2$, $R^3$, and $R^4$ are each independently one or more of a hydrogen, an alkane, an alkene, an alkyne, an aromatic, a hydroxyl group, a thiol, an amine, or an amide, and X is one or more of a chloride group, a bromide group, an iodide group, a fluoride group, or a hydroxyl group; or the at least one hydrogen bond acceptor compound has the chemical structure: $MX_n$, wherein M is one or more of an alkali metal, an alkaline earth metal, or a transition metal, and X is one or more of a chloride group, a bromide group, an iodide group, a fluoride group, or a hydroxyl group;

wherein the at least one hydrogen bond donor compound comprises one or more of benzoic acid, citric acid, oxalic acid, malonic acid, octanoic acid, dodecanoic acid, palmtic acid, lauric acid, myristic acid, adipic acid, acetic acid, phenyl acetic acid, propionic acid, phenylpropionic acid, succinic acid, lactic acid, glycerol, ethylene glycol, propanol, ethanol, sucrose, glucose, hexanol, octanol, urea, thiourea, acetamide, or benzamide, wherein the drilling fluid has a solids content of from 1 weight percent to 10 weight percent based on the total weight of the drilling fluid, and wherein the drilling fluid has a plastic viscosity of from 1 cP to 100 cP.

2. The drilling fluid of claim 1, wherein the drilling fluid comprises an aqueous fluid in an amount from 0.5 weight percent to 15 weight percent based on the total weight of the drilling fluid.

3. The drilling fluid of claim 1, wherein the drilling fluid comprises viscosifier in an amount from 0.01 weight percent to 10 weight percent based on the total weight of the drilling fluid.

4. The drilling fluid of claim 1, wherein the hydrogen bond acceptor compound comprises choline chloride, ferric chloride, or both.

5. The drilling fluid of claim 4, wherein the hydrogen bond donor compound comprises urea, glycerol, citric acid, oxalic acid, ethylene glycol, or combinations thereof.

6. The drilling fluid of claim 1, wherein the drilling fluid has a yield point of from 1 pounds of force per one hundred square feet (lbf/100 ft$^2$) to 60 lbf/100 ft$^2$.

7. A method for drilling a well in a subterranean formation, the method comprising:
operating a drill in the subterranean formation in the presence of a drilling fluid, wherein the drilling fluid comprises:
one or more deep eutectic solvents in an amount greater than or equal to 70 weight percent based on the total weight of the drilling fluid, each deep eutectic solvent comprising at least one hydrogen bond acceptor compound and at least one hydrogen bond donor compound, wherein a molar ratio of the total moles of the hydrogen bond donor compounds to the total moles of the hydrogen bond acceptor compounds in each deep eutectic solvent is from 0.1 to 1.0, wherein the drilling fluid has a density of from 200 kilograms per cubic meter to 1,300 kilograms per cubic meter, wherein the drilling fluid has a viscosity of from 0.5 pascal-seconds to 7.5 pascal-seconds when measured at 25 degrees Celsius, wherein one or more of:
the at least one hydrogen bond acceptor compound comprises one or more of a quaternary ammonium salt, a phosphonium salt, a sulfonium salt, a pyridinium salt, or a metallic salt, the at least one hydrogen bond acceptor compound has the chemical structure: $R^1R^2R^3R^4NX$, wherein $R^1$, $R^2$, $R^3$, and $R^4$ are each independently one or more of a hydrogen, an alkane, an alkene, an alkyne, an aromatic, a hydroxyl group, a thiol, an amine, or an amide, and X is one or more of a chloride group, a bromide group, an iodide group, a fluoride group, or a hydroxyl group, or the at least one hydrogen bond acceptor compound has the chemical structure: $MX_n$, wherein M is one or more of an alkali metal, an alkaline earth metal, or a transition metal, and X is one or more of a chloride group, a bromide group, an iodide group, a fluoride group, or a hydroxyl group, wherein the at least one hydrogen bond donor compound comprises one or more of benzoic acid, citric acid, oxalic acid, malonic acid, octanoic acid, dodecanoic acid, palmtic acid, lauric acid, myristic acid, adipic acid, acetic acid, phenylacetic acid, propionic acid, phenylpropionic acid, succinic acid, lactic acid, glycerol, ethylene glycol, propanol, ethanol, sucrose, glucose, hexanol, octanol, urea, thiourea, acetamide, or benzamide, wherein the drilling fluid has a solids content of from 1 weight percent to 10 weight percent based on the total weight of the drilling fluid, and wherein the drilling fluid has a plastic viscosity of from 1 cP to 100 cP.

8. The method of claim 7, further comprising introducing the drilling fluid into the subterranean formation.

9. The method of claim 8, wherein introducing the drilling fluid into the subterranean formation comprises injecting the drilling fluid through a drill string of the drill.

10. The method of claim 7, further comprising circulating at least a portion of the drilling fluid within the subterranean formation.

11. The method of claim 7, further comprising preparing the drilling by a method comprising dry mixing the at least one hydrogen bond acceptor compound and the at least one hydrogen bond donor compound to form the one or more deep eutectic solvents.

* * * * *